United States Patent

Hyatt

[15] 3,636,433
[45] Jan. 18, 1972

[54] VOLTAGE STABILIZER APPARATUS
[72] Inventor: Edward Philip Hyatt, Caterham, England
[73] Assignee: Brandenburg Limited
[22] Filed: Jan. 28, 1970
[21] Appl. No.: 6,475

[30] Foreign Application Priority Data
Jan. 29, 1969 Great Britain..................4,972/69

[52] U.S. Cl............................................321/18, 321/47
[51] Int. Cl. ...............................................H02m 7/12
[58] Field of Search....................321/18, 47; 323/6, 48, 60, 323/62

[56] References Cited

UNITED STATES PATENTS

| | | | |
|---|---|---|---|
| 3,163,815 | 12/1964 | Meier | 323/48 X |
| 3,184,675 | 5/1965 | Macklem | 323/48 X |
| 3,284,696 | 11/1966 | Nagata et al. | 323/48 |
| 3,389,329 | 6/1968 | Quirk et al. | 323/48 X |
| 3,408,553 | 10/1968 | Bishop | 321/18 X |
| 3,440,519 | 4/1969 | Macemon | 323/6 |
| 3,440,520 | 4/1969 | Jones et al. | 323/6 |
| 3,454,862 | 7/1969 | Kurimura et al. | 321/47 X |
| 3,525,035 | 8/1970 | Kakalec | 321/18 X |

Primary Examiner—William M. Shoop, Jr.
Attorney—Lawrence E. Laubscher

[57] ABSTRACT

The invention provides a high-voltage low-current electric supply apparatus which is stabilized by use of a low-voltage transistor. A transformer with high-leakage inductance has two secondary windings, from one of which the high-voltage output is obtained; the other winding is a low-voltage winding supplying a transistor forming a controllable load. By controlling this transistor, as a function of the high-voltage output, the high-voltage output is controlled and can be stabilized.

3 Claims, 4 Drawing Figures

Edward P. Hyatt
INVENTOR

BY
Lawrence E. Laubscher
ATTORNEY

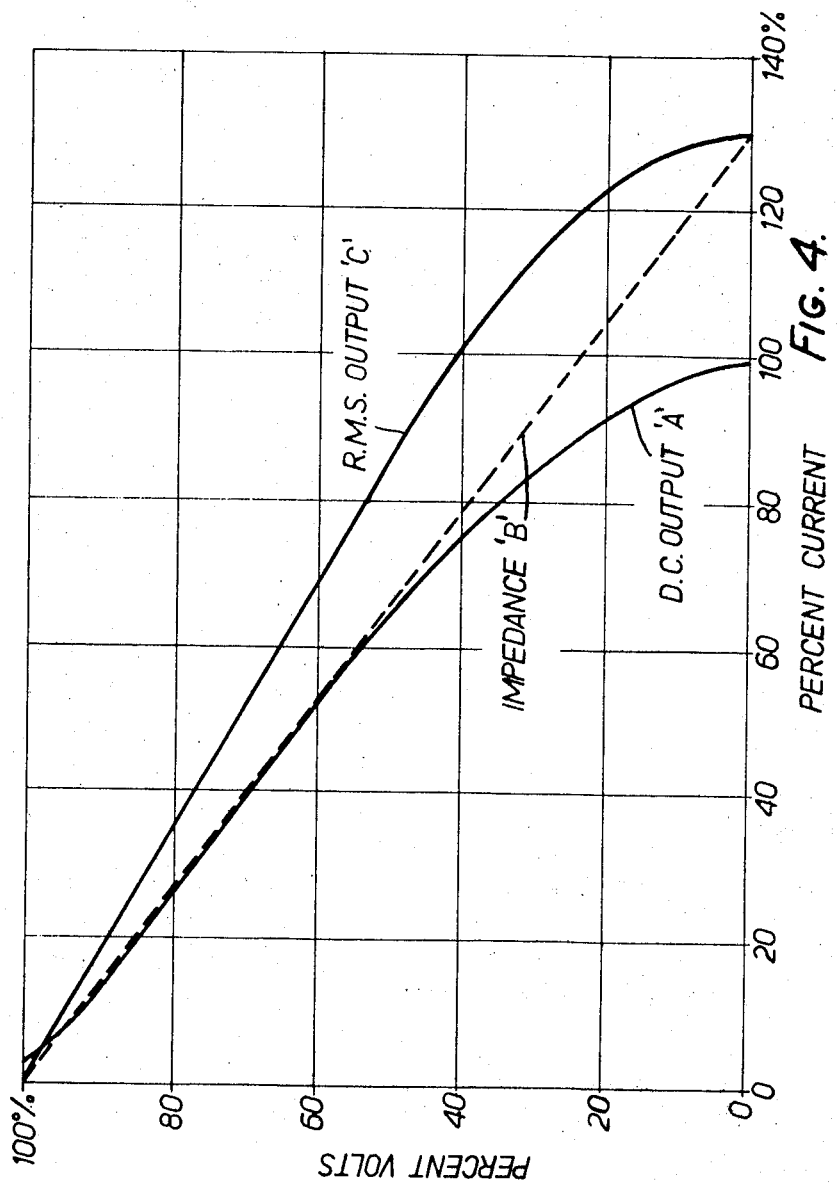

VOLTAGE STABILIZER APPARATUS

This invention relates to voltage stabilizer apparatus and more particularly to such apparatus including a high leakage reactance transformer. The present invention is concerned with the provision of a constant output voltage or current transformer apparatus which, within limits, is independent of change of primary voltage or frequency or load.

The invention includes an electric supply apparatus comprising a transformer, a primary winding for connection to a supply and at least two secondary windings, one of said windings producing a voltage higher than the other, the magnetic conditions of said transformer being such that the combined output of the two secondary windings is related so that increase of output from one winding decreases the available output from the other winding, means for supplying a load from one winding and means for controlling a load on the other winding as a function of the load on the first, whereby to stabilize the voltage or current output of the supply to said load.

Features and advantages of the invention will appear from the following description of embodiments thereof, given by way of example, in conjunction with the accompanying drawings, in which:

FIG. 4 is a graph showing the voltage current characteristic of the transformer of FIG. 3.

FIG. 1 is a circuit diagram of a power supply apparatus for producing a direct current (DC) supply from an alternating current (AC) source, the DC output being stabilized against changes of the input voltage.

Figure 1:
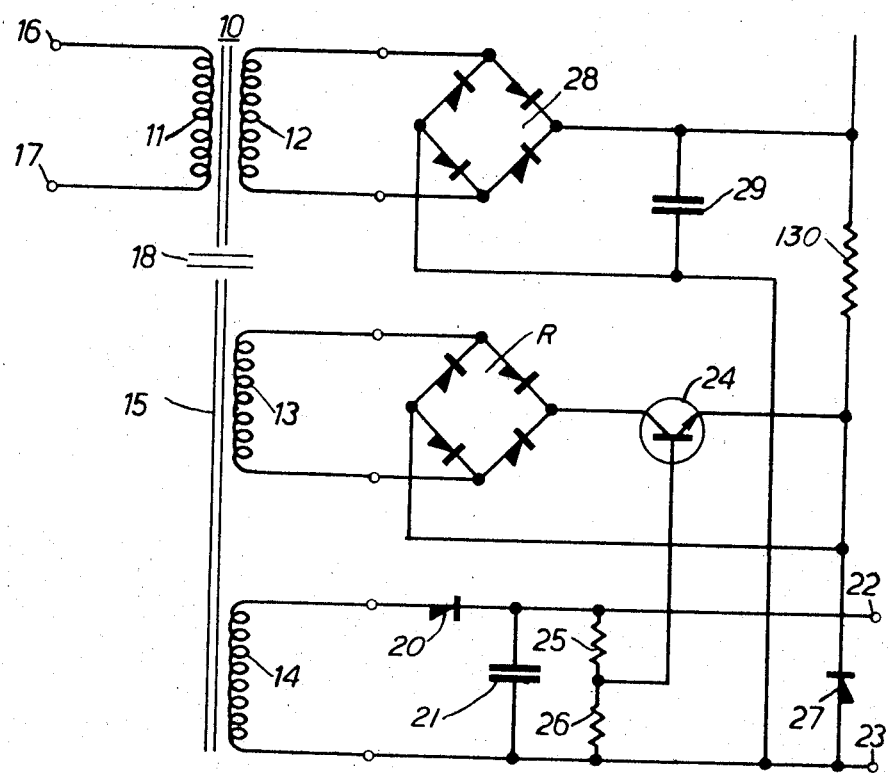
FIG. 1 is a circuit diagram of a stabilized power supply apparatus.

This apparatus, a transformer 10, has windings 11, 12, 13 and 14 wound about a magnetic core 15. The primary circuit of the transformer consists of coil 11, to the terminals 16 and 17 of which the input voltage is applied. The three coils 12, 13 and 14 are disposed on the same core 15 but the magnetic coupling of these coils with the primary coil 11 is controlled by a magnetic shunt shown at 18. The effect of the magnetic shunt is to cause the transformer to operate as though it had a high impedance in series in the primary circuit thus limiting the current flow into the transformer even under heavy load conditions. Because of the disposition of shunt 18 with respect to coils 13 and 14, these coils are more tightly coupled to each other than to the primary coil 11. Coil 12 is more tightly coupled to coil 11 than to coils 13 and 14.

The coil 14 feeds a rectifier 20, the rectified output being smoothed by a filter capacitor 21 and fed to output terminals 22, 23 to which the main load is connected.

In addition to the load imposed upon the transformer by this main load, there is imposed a further load, of variable nature, on the coil 13. The load is presented by a bridge rectifier R across the output of which is the collector-emitter path of a transistor 24. The transistor operates as a variable resistance of value controlled by the base-emitter voltage. This voltage is obtained by comparison of a comparison voltage (i.e., a proportion of the voltage across terminals 22, 23) obtained by a potential divider 25, 26, with the reference voltage across a Zener diode 27. Working voltage across diode 27 is maintained by a bridge rectifier 28, capacitor 29 and limiting resistor 130.

In effect the coil 12 is shunted by a variable resistance, presented by the transistor, so that the load on the coil will be varied by variation of the value of this resistance. Since the total power loading that may be imposed on the secondary circuit is limited by the effective primary impedance an increase in load imposed upon coil 12 will result in a reduction in the voltage developed across coil 14.

As the base-emitter voltage of the transistor is a function of the difference between the output voltage and the reference voltage provided by Zener diode 27, the load on coil 13, and hence the output voltage, will be controlled as a function of this difference.

Figure 2:
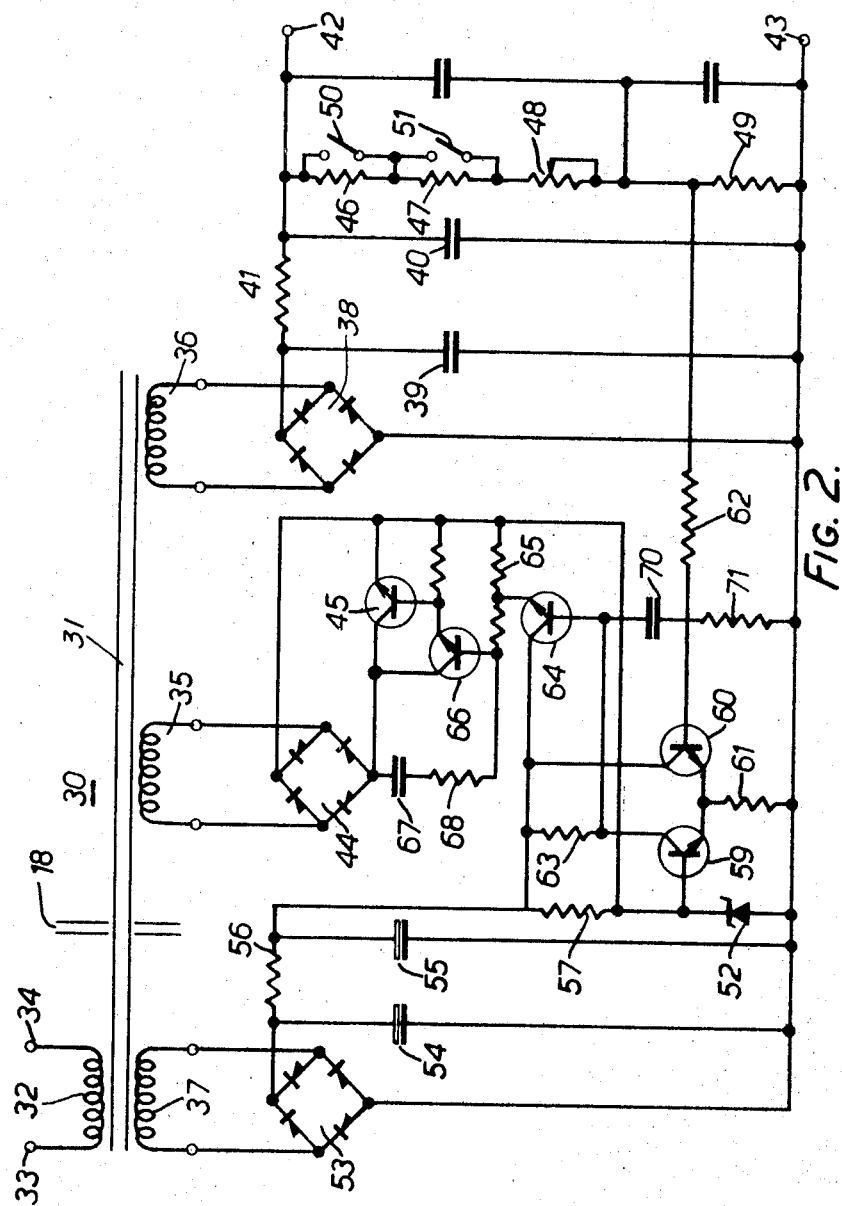
FIG. 2 is a circuit diagram of a power supply apparatus with a more comprehensive form of stabilization.

A more comprehensive form of circuit is shown in FIG. 2. In this figure, there is provided an input transformer 30, generally similar in its arrangement to the transformer 10 of FIG. 1. The transformer includes a core 31 on which is wound a primary coil 32, the terminals 33, 34 of which are adapted to be connected to an alternating current supply. Also disposed on the core of the transformer are two windings 35 and 36; the core of the transformer includes a magnetic shunt 18 the effect of which, as described above, is to provide a high leakage reactance, and to diminish the coupling between the primary coil 32 and the coils 35 and 36. A further coil 37 is disposed on the core of the transformer, relatively tightly coupled with the primary winding 32.

The winding 36 provides the main output of the transformer. In one form of the apparatus, similar to that shown, the winding 36 was adapted to produce nominally 2,500 volts r.m.s. at a load of 8.5 ma. A high-voltage bridge rectifier 38 is connected to the winding 36, and the output from the rectifier is smoothed by a filter circuit comprising capacitors 39 and 40 and series resistor 41. The filtered output is applied to the main output terminals 42, 43.

As described above, the winding 36 is closely coupled to the winding 35, and the e.m.f. at the terminals of the two windings will be related to the turns ratio of the two windings. As there is a relatively loose magnetic coupling between the two windings 35, 36 and the primary winding 32, the maximum current available in either of the windings 35, 36 will be in inverse proportion to the number of turns on that winding, for any given transformer and supply voltage. Also, the sum of the volt-ampere product of the winding 35 and that of winding 36 will be equal to the maximum volt-ampere output obtainable from either winding for a given primary applied voltage.

Accordingly, by increasing the volt-ampere product of the load imposed on winding 35, it is possible to control the output of the winding 36. To provide a variable load on winding 35, the terminals of the winding are connected to a bridge rectifier 44, across the rectified output of which is directly connected the collector-emitter path of a transistor 45 and, in the manner described generally with reference to FIG. 1, the resistance presented by this path is varied in accordance with the conditions existing at the main output terminals 42, 43.

In this embodiment of the invention, the output is controlled as a function of the output voltage. Connected across the terminals 42, 43 is a voltage divider comprising resistors 46, 47, 48 and 49. To enable the effective ratio of the potential divider to be varied, resistors 46 and 47 are shunted by switches 50 and 51, respectively, and resistor 48 is made variable. The comparison voltage appearing across resistor 49 is compared with a reference voltage obtained by means of a Zener diode 52. A voltage is maintained across the diode by means including a rectifier bridge 53 connected to the terminals of winding 37, the rectified output of which is filtered by a filter comprising capacitors 54 and 55 and a series resistor 56. The rectified and filtered output is applied to the diode 52 through a limiting resistor 57. A voltage comparator is provided, consisting of a differential amplifier including transistors 59, 60, with a common emitter resistor 61, the reference voltage from the diode 52 being applied to the base of transistor 59, and the voltage across the resistor 49 is applied to the base of transistor 60, through a series resistor 62. Transistor 59 has a collector load resistance 63 and the voltage across this load is applied to a further transistor 64. This transistor is arranged as a DC emitter-follower, with an emitter resistor 65 included in the base-emitter circuit of a transistor 66; the transistor 66 is arranged with the transistor 45 as a Darlington pair.

The voltage that appears across the resistor 49 will be a fraction of the output voltage, determined by the values of resistors 46, 47, 48 and 49. Variation of this voltage, relative to the reference voltage provided by the diode 52, will cause a change of collector current of the transistor 59. Transistor 64, which functions primarily as an impedance converting device, produces a corresponding change of base current of transistor 66, and the resistance presented by the transistor 45, and hence the loading on winding 35, will be varied accordingly. It will be observed that the transistor is connected directly across the output of the bridge rectifier 44, without the interposition of a filter network, since the inclusion of such a network would have the effect of slowing the response time of the control loop. The inclusion of, for example, a capacitor of substantial value across the output of the rectifier would impose equally a capacitive load across the collector-emitter terminals of transistor 15. For reasons which are explained hereinafter, it is desirable, however, that the loading current on winding 35 should include a capacitively reactive component, and this is provided by the inclusion of a capacitor 67 in series with resistor 68 connected between collector and base of transistor 66. The response time of the stabilizing loop is also affected by the inclusion of a reactive shunt to the load of transistor 64, provided by a capacitor 70 and resistor 71.

Figure 3:
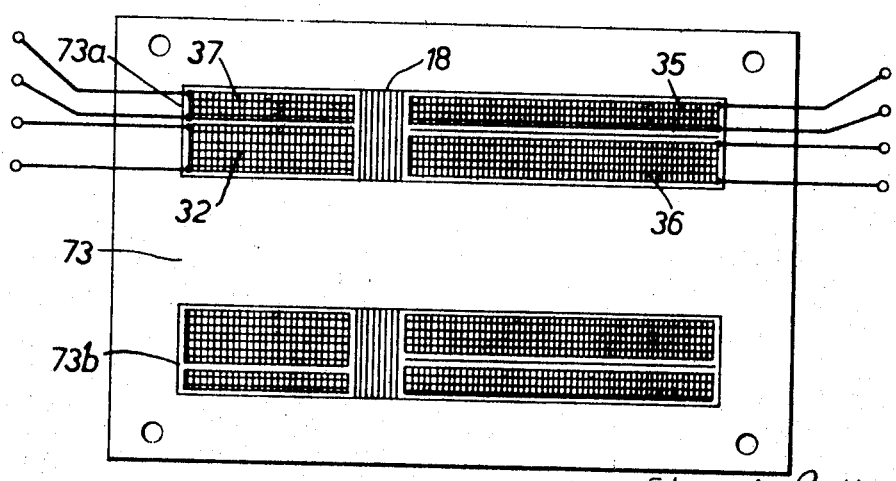
FIG. 3 is a plan view, partly in section, of a transformer suitable for the apparatus of FIG. 2.

The transformer 30 is a component the design of which has a substantial bearing on the optimum performance of a control device such as that described. FIG. 3 is a plan view partly in section of a transformer which has been found suitable for a practical embodiment of the invention. This transformer includes a magnetic core member 73, composed of a stack of laminations of magnetic material, the laminations having winding windows 73a and 73b. The primary winding 32, corresponding to winding 32 of FIG. 2, is disposed on an inner part of the central core of the stack, and outside this winding is disposed the winding 37; the two windings occupy a length of approximately one-third of the central limb of the stack. A magnetic shunt 18 is disposed on the core, consisting of two stacks of laminations inserted in the core windows, the laminations including an air gap or inserted nonmagnetic shim to provide a desired degree of magnetic shunting of the core flux. The winding 36 is disposed on the remaining part of the core, and is overwound by the winding 35. In this way, the two windings 35 and 36, disposed both on the same side of the magnetic shunt 37, will be closely coupled, as will be the windings 32 and 37, but there is a reduced coupling between the pair of windings 32 and 37 and the pair of windings 35, 36. The effect is that an approximately constant total volt-ampere output will be obtainable from the windings 35 and 36 and an increase of the loading presented by one winding will give rise to a corresponding diminution of the output of the other.

FIG. 4 is a graph which indicates the performance of a transformer such as that shown in FIG. 3, as the output voltage and output current, in terms of percentages. The graph is a typical one, and does not take into account losses due to winding resistances or rectifier efficiency.

Curve A is the voltage-current curve of the direct current derived from winding 36 through a rectifier, and using a capacitance shunting the output of the rectifier, as in a capacitive input filter circuit. Curve B is the corresponding r.m.s. current in the transformer winding, for the condition corresponding to curve A. It is found that in this case the ratio of r.m.s. to direct current is of the order of 1.3:1. It may be observed that an extension of the approximately linear portion of curve A meets curve B at near the point of zero voltage output. Curve A is approximately linear over about 60 percent of its extent, from the zero current point. In this range, the ratio of direct current to r.m.s. voltage can be taken as the normal or unity value, so long as the current loading is at least 10 percent of the total current capacity of the transformer; in this condition the waveform of the alternating current approaches a square wave. This square waveform is not due to saturation of the core material, but is dependent on the flow of current from the highly inductive output winding to the rectifier circuit associated with a capacitive load. The alternating current waveform generated in one of the two windings 35, 36 will be reflected into the other and to avoid instability in the control loop arising from reflected waveforms of like form when the transformer is connected as part of a stabilizing system, it is desirable that any rectifying circuit connected to each of the secondary windings should impose a compatible load on these windings.

The characteristics of the transistor 45, used in the circuit of FIG. 2, are such that the loading on the transformer winding 35 becomes of a constant current nature, and somewhat resembling the current which would flow if a choke input-type filter were used to follow the rectifier 44. This would affect the nature of the transformer characteristic, and accordingly a capacitive current is introduced by means of the resistance capacitance circuit presented by the two components 67, 68. The capacitive current is of a magnitude such that the transistor 45 imposes an r.m.s. current loading on the winding 35 which approximates curve B in the graph of FIG. 4. It is necessary, when selecting transistor 45, to have regard to the nature of the current which is carried by this device when calculating its peak power dissipation.

In a practical form of the embodiment shown in FIG. 2, the apparatus was designed to work with an applied voltage of 200–250 volts AC, at a frequency of 50±1 Hz. The output voltage at terminals 42, 43 was variable in the range of 100–2,500 volts, at an output current of 5 ma. The output voltage was constant to within 1 percent over the range from no load to full load.

The principal design features can be derived from the graph of FIG. 4. In the case given, taking an output voltage of 2,500 volts as being equal to the r.m.s. voltage, a working point of this figure is selected on a linear part of the curve A conveniently in the region of 50 percent of the maximum output. The winding will then have an open circuit voltage of 5,000 volts. Since this figure must be obtainable with the minimum input voltage of 200 volts, the uncorrected turns ratio between windings 32 and 36 will be 1:25.

The required output current is 5 ma., but the potential divider 46, 47, 48, 49 also draws a small current which can be conveniently about 1.25 ma., giving a total current of 6.25 ma. This will be seen to correspond with 62.5 percent of the output current at the working point on curve A. For an input voltage of 200 volts the short circuit direct current will be 10 ma. and the short circuit r.m.s. alternating current 13 ma. The magnetic shunt 37 is adjusted to give this effect.

At the higher limit of applied voltage the short circuit current will rise proportionately, since the internal impedance of the transformer is fixed by adjustment of the shunt so that at 250 volts maximum input the r.m.s. short circuit current in the winding 36 will be 16.25 ma. If the conditions of service require that the transformer should be capable of withstanding such a short circuit, the winding 36 must, in this example be wound so as to be capable of handling without damage, the current of 16.25 ma. Alternatively, means can be provided responsive to the output current of the supply, and introduced into the stabilizing circuit to limit the output current to a lower figure. Normally, with the highest applied input voltage, the maximum open circuit voltage of winding 36 will be 6,250 volts.

It is a substantial advantage of the system described that the voltage at winding 35, and the rectified voltages applied to the semiconductor devices, apart from the rectifiers of the bridge 38, operate at very low voltages in comparison with those existing at the terminals of the winding 36. In this way, control of the high output voltage at the terminals of this winding is effected by means of semiconductors which have maximum voltage ratings which are low enough for the devices to be readily available and reliable in operation.

In the specific embodiment described, the ratio between the windings 35 and 36 is 1:50. It follows that the maximum open circuit voltage of winding 35 is 125 volts and the maximum short circuit current 812.5 ma. when the primary input voltage is at its maximum figure of 250 volts. Winding 35 can be designed on the same principles as winding 36, in the manner described above, with reference to the characteristics shown in FIG. 4. It may be observed that the open circuit voltages of windings 35 and 36 do not exist in normal operation, for if the load is removed completely from the output terminals 42, 43 the voltage is prevented from rising since the transistor 45 conducts to impose an equivalent load on the winding 35. It is necessary to have regard to this fact in selecting the transistor 45.

A transformer suitable for use in the circuit of FIG. 2, in giving a performance as outlined above, had the following characteristics.

|  | Input | | Unit |
| --- | --- | --- | --- |
|  | 200 | 250 | v. AC |
| Winding 35 o/c volts | 100 | 125 | v. r.m.s. |
| Winding 36 o/c volts | 5,000 | 6,250 | v. r.m.s. |
| Total volt-amperes | 65 | 101.6 | v.-a. |
| Winding 35 s/c current | 650 | 812.5 | ma. r.m.s. |
| Winding 36 s/c current | 13 | 16.25 | ma. r.m.s. |
| Turns Ratio 32/35 | 2:1 | | |
| Turns Ratio 32/36 | 1:25 | | |
| Turns Ratio 35/36 | 1:50 | | |
| Overall impedance | | | |
| Winding 35 | 154 ohm | | |
| Winding 36 | 385 kΩ. | | |

What is claimed is:
1. A voltage-stabilized electrical power supply, comprising
a. a transformer (10, 30) including
   1. a core;
   2. a primary winding (11, 32) wound on said core, said primary winding being adapted for connection with a source of alternating-current voltage;
   3. output (14, 36) and loading (13, 35) secondary windings wound on said core, said core defining a relatively low reluctance main path for magnetic flux threading said primary and secondary windings, said core including a magnetic shunt portion (18) arranged to cause said output and loading secondary windings to be more tightly coupled with each other than with said primary winding, respectively; and
   4. a third secondary winding (12, 37) mounted on said core in tightly coupled magnetic arrangement relative to said primary winding;
b. circuit means including first rectifier means (20, 38) and output terminal means (22, 23; 42, 43) for connecting said output secondary winding with a direct-current external load;
c. means (27, 52) establishing a direct-current reference voltage;
d. means for applying a load across said loading secondary winding as a function of the potential difference between said reference voltage and the instantaneous output voltage that appears across said output terminals, said load applying means comprising
   1. bridge rectifier means (R, 44) including a first pair of diagonally opposed terminals connected directly across said loading winding;
   2. controllable means (24, 45) including power circuit electrodes connected across the remaining pair of diagonally opposed terminals of said bridge rectifier means, respectively, said controllable means including also a control electrode; and
   3. control means for applying across said control electrode and one of said power circuit electrodes a control voltage that is a function of the difference between said reference voltage and a comparison voltage that is a direct function of said instantaneous output voltage, the voltage developed across said loading secondary winding in response to an input voltage applied across said primary winding being substantially greater than the voltage developed across said output secondary winding for the same input voltage; and
e. third rectifier means (28, 53) connecting said third secondary winding with said control means, thereby to energize said control means with a direct-current voltage.
2. Apparatus as defined in claim 1, wherein said control means comprises differential amplifier means (59, 60) including a pair of input terminals connected with the sources of said reference and comparison voltages, respectively; wherein said controllable means comprises a first transistor (45); and further including means including a second transistor (66) connected with said first transistor to define a Darlington circuit, and means including a third transistor (64) for connecting the output of said differential amplifier means with the input of said Darlington circuit.
3. Apparatus as defined in claim 2, and further including capacitance means (67) connected between the control electrode and one power circuit electrode of said second transistor to effect capacitive reactive loading of said loading secondary winding, and reactive shunt means (70, 71) connected with the control electrode of said third transistor for controlling the response time of the stabilizing loop defined by said control means.

* * * * *